United States Patent
Sakaguchi (10) Patent No.: US 6,720,982 B1
(45) Date of Patent: Apr. 13, 2004

(54) MISOPERATION PREVENTION METHOD AND APPARATUS, AND STORAGE MEDIUM FOR STORING SOFTWARE PRODUCT FOR PREVENTING MISOPERATION

(75) Inventor: Akira Sakaguchi, Fuchu (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,700

(22) Filed: Jan. 7, 2000

(30) Foreign Application Priority Data

Jan. 19, 1999 (JP) .......................................... 11-010844

(51) Int. Cl.⁷ .................................................. G09G 5/00
(52) U.S. Cl. ........................ 345/768; 345/784; 345/788
(58) Field of Search ........................ 345/768, 781–791, 345/806–809, 760–762, 848, 850

(56) References Cited

U.S. PATENT DOCUMENTS

| | | | |
|---|---|---|---|
| 5,577,188 A | | 11/1996 | Zhu |
| 5,590,265 A | * | 12/1996 | Nakazawa .................. 345/790 |
| 5,619,655 A | * | 4/1997 | Weng et al. ..................... 700/1 |
| 5,638,501 A | | 6/1997 | Gough et al. |
| 5,651,107 A | * | 7/1997 | Frank et al. ................ 345/589 |
| 5,655,094 A | * | 8/1997 | Cline et al. ................ 345/684 |
| 5,805,163 A | * | 9/1998 | Bagnas ....................... 345/768 |
| 5,825,356 A | | 10/1998 | Habib et al. |
| 5,831,615 A | * | 11/1998 | Drews et al. ............... 345/768 |
| 5,999,176 A | * | 12/1999 | Kamper ...................... 345/787 |
| 6,118,427 A | * | 9/2000 | Buxton et al. .............. 345/629 |
| 6,246,407 B1 | * | 6/2001 | Wilks et al. ................ 345/790 |
| 6,333,753 B1 | * | 12/2001 | Hinckley .................... 345/156 |
| 6,369,837 B1 | * | 4/2002 | Schirmer .................... 345/764 |
| 6,411,300 B1 | * | 6/2002 | Hirayama ................... 345/473 |
| 6,429,883 B1 | * | 8/2002 | Plow et al. ................. 345/768 |

FOREIGN PATENT DOCUMENTS

| | | |
|---|---|---|
| JP | 60-167024 | 8/1985 |
| JP | 05-189185 | 7/1993 |
| JP | 05-324240 | 12/1993 |
| JP | 06-149525 | 5/1994 |
| JP | 06-124183 | 6/1994 |
| JP | 08-152989 | 6/1996 |
| JP | 10-177466 | 6/1998 |

OTHER PUBLICATIONS

Russell Borland, "Microsoft Outlook 97", Microsoft Press, ©1997, pp. 21–82.

\* cited by examiner

*Primary Examiner*—Kristine Kincaid
*Assistant Examiner*—Thomas J Joseph
(74) *Attorney, Agent, or Firm*—Scully, Scott, Murphy & Presser; Derek S. Jennings (57) ABSTRACT

The present invention invalidates the operator's input which interferes with the normal operation of an application. More particularly, a transparent window 110 is previously generated behind an application 120 for which an operator's misoperation can occur. And, upon the detection of a predetermined operation having occurred on the application 120, the operator's misoperation such as double clicking is invalidated by outputting the transparent window 110 in front of the application 120.

11 Claims, 6 Drawing Sheets

```
<HTML><HEAD>
<SCRIPT LANGUAGE="JavaScript">
var DW=Packages.dw;

function init() {
     DW.start(0,0,1024,768);    ~— 401

}

</SCRIPT>
</HEAD>
<BODY onLoad="init()">
</BODY></HTML>
```

Figure 6  400

```
<HTML><HEAD>
<SCRIPT LANGUAGE="JavaScript">
var DW=Packages.dw;

function init() {
     DW.bottom();    ~— 411

} function nextPage() {
     DW.top();    ~— 413
     location="http://nextURL";
}
</SCRIPT>
</HEAD>
<BODY onLoad="init()">
<A HREF="javascript:nextPage()">
<IMG SRC="http://.../botton.gif"></A>
</BODY></HTML>
```

Figure 7  410

```
<HTML><HEAD>
<SCRIPT LANGUAGE="JavaScript">
var DW=Packages.dw;

function init()  {
     DW.kill();

}

</SCRIPT>
</HEAD>
<BODY onLoad="init()">
</BODY></HTML>
```

MISOPERATION PREVENTION METHOD AND APPARATUS, AND STORAGE MEDIUM FOR STORING SOFTWARE PRODUCT FOR PREVENTING MISOPERATION

BACKGROUND OF THE INVENTION

1. Technical Field

The present invention is related to a method for preventing the misoperation of an application, and more specifically to a method for interrupting the operator input to a given application by causing a transparent window to appear in front of the application window.

2. Prior Art

In web browser such as Netscape Navigator (trademark of Netscape Corporation) or Internet Explorer (trademark of Microsoft Corporation), for fast net-surfing, even if a button on the browser is pushed and the program corresponding to the button is being executed, the pushing of the particular button or any other button can interrupt that program to execute a different (or the same) program.

For instance, if the button for initiating JavaScript is consecutively pushed twice, the JavaScript started by the first push of the button abends when the button is pushed for the second time, and the JavaScript started by the second push of the button is executed. However, depending on the situation in which the first JavaScript abends, it may have already changed global variables so that the JavaScript for the second time cannot operate normally.

Thus, sometimes programmers want to prevent buttons other than a predetermined button from being pushed until the process executed by pushing it terminates.

It is an object of the present invention to provide a system in which the misoperation by the operator is invalidated without radically changing the processing of an application.

It is further object of the present invention to provide a system in which, even if the time interval between the normal operation and the misoperation by the operator is very short, the misoperation is invalidated.

It is a further object of the present invention to provide a misoperation prevention system by which the system is less burdened in operation.

It is a further object of the present invention to provide a misoperation prevention system, in which the operator does not feel a sense of incongruity when performing the operation.

It is a further object of the present invention to provide a misoperation prevention system, in which the resources required at the time of execution are reduced.

SUMMARY OF THE INVENTION

A transparent window is previously generated behind an application for which an operator's misoperation can occur. And, if the occurrence of a predetermined operation on the application is detected, outputting the transparent window in front of the application invalidates the operator's misoperation such as double-click.

In an embodiment of the present invention, there is provided a misoperation prevention method which is executed on an apparatus having a display screen for displaying an application window, and a pointing device for pointing to a position on said display screen, the method comprising the steps of:
(a) generating a transparent window and positioning it behind the application window; and
(b) moving the transparent window in front of the application window in response to the detection of a predetermined operation input using the pointing device.

As used herein, "application" is a concept that includes not only web browsers described later in the embodiments but also various applications. Further, "pointing device" is a concept that includes mouse, trackball, track point (trademark of IBM (International Business Machines Corporation)), joystick, touch panel, and the like. And, "transparent window" is a concept that includes the case in which it is partially transparent (or semitransparent), or the case in which it is totally semitransparent.

In a further embodiment of the present invention, there is provided a misoperation prevention method which is executed on an apparatus having a display screen for displaying an application window, and a pointing device for pointing to a position on the display screen, the method comprising the steps of:
(a) generating a transparent window and positioning it behind the application window;
(b) responding to the detection of a predetermined operation input using the pointing device for executing a process corresponding to the predetermined operation;
(c) moving the transparent window in front of the application window; and
(d) moving the transparent window behind the application window after the execution of the process terminates.

In a further embodiment of the present invention, there is provided a misoperation prevention method which is executed on an apparatus having a display screen for displaying an application window, a pointing device for pointing to a position on said display screen, and a timer, the method comprising the step of:
(a) generating a transparent window and positioning it behind the application window;
(b) responding to the detection of a predetermined operation input using said pointing device for executing a process corresponding to the predetermined operation;
(c) moving said transparent window in front of the application window; and
(d) moving the transparent window behind the application window in response to a timer interruption that occurs after a predetermined time elapses since the transparent window has been moved in front of the application window in the above step (c).

In a further embodiment of the present invention, there is provided a misoperation prevention apparatus having a display screen for displaying an application window, and a pointing device for pointing to a position on the display screen, the apparatus comprising:
(a) a transparent window control unit for generating a transparent window, and instructing the operating system to position it behind the application window;
(b) a transparent window main body generated by said operating system; and
(c) a transparent window procedure for instructing the operating system to move the transparent window in front of the application window in response to the detection of a predetermined operation input using the pointing device.

In a further embodiment of the present invention, there is provided a storage medium for storing a software product for misoperation prevention which is executed on an apparatus having a display screen for displaying an application window, and a pointing device for pointing to a position on the display screen, the software product comprising:

(a) a program code for instructing the apparatus to generate a transparent window and position it behind the application window; and (b) a program code for instructing the apparatus to move the transparent window in front of the application window in response to the detection of a predetermined operation input using the pointing device.

In a further embodiment of the present invention, three is provided a storage medium for storing a software product for misoperation prevention which is executed on an apparatus having a display screen for displaying an application window, and a pointing device for pointing to a position on the display screen, the software product comprising:

(a) a program code for instructing the apparatus to generate a transparent window and positioning it behind the application window;

(b) a program code responsive to the detection of a predetermined operation input using the pointing device for instructing the apparatus to execute a process corresponding to the predetermined operation:

(c) a program code for instructing the apparatus to move the transparent window in front of the application window; and (d) a program code for instructing the apparatus to move the transparent window behind the application window after the execution of the process terminates.

In a further embodiment of the present invention, there is provided a storage medium for storing a software product for misoperation prevention which is executed on an apparatus having a display screen for displaying an application window, a pointing device for pointing to a position on the display screen, and a timer, the software product comprising:

(a) a program code for instructing the apparatus to generate a transparent window and position it behind the application window;

(b) a program code responsive to the detection of a predetermined operation input using the pointing device for instructing the apparatus to execute a process corresponding to the predetermined operation;

(c) a program code for instructing said apparatus to move the transparent window in front of the application window; and (d) a program code for instructing the apparatus to move the transparent window behind the application window in response to a timer interruption that occurs after a predetermined time elapses since the transparent window has been moved in front of the application window in the above step (c).

BRIEF DESCRIPTION OF THE DRAWINGS

Preferred embodiments of the present invention will now be described by way of example only, with reference to the accompanying drawings in which.

DETAILED DESCRIPTION OF THE PREFERRED EMBODIMENTS OF THE INVENTION

Figure 1:
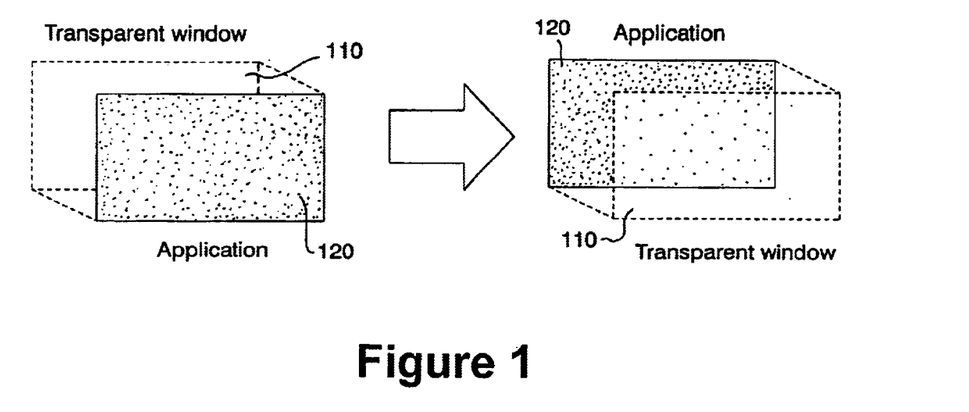
FIG. 1 is for explaining the summary of the present invention.
Figure 2:
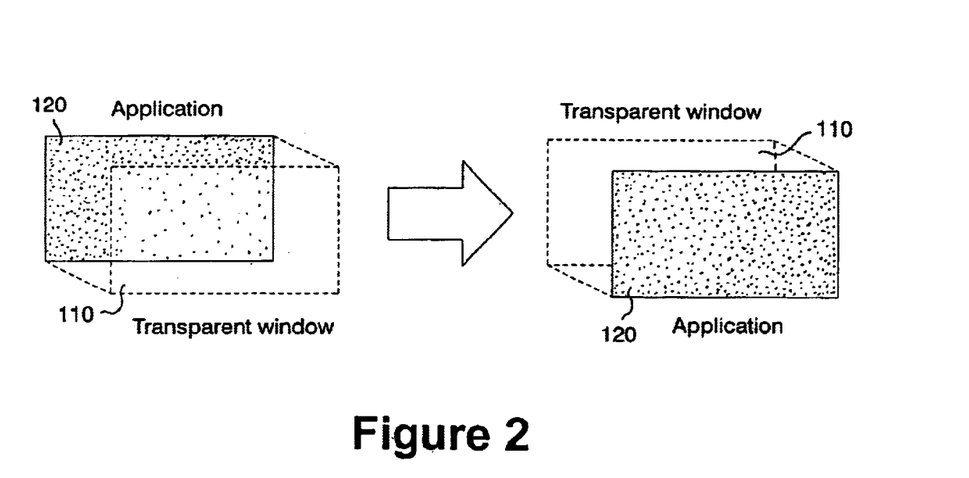
FIG. 2 is for explaining the summary of the present invention.

FIGS. 1 and 2 are figures showing a general description of the present invention. As shown in FIG. 1, a transparent window 110 is previously generated behind a given application 120 for which an operator's misoperation can occur. And, if the occurrence of a predetermined operation is detected on the application 120, a process corresponding to the operation is executed, and the transparent window 110 is outputted in front of the application 120.

And, as shown in FIG. 2, if a preset condition is fulfilled, for instance, if a predetermined process terminates, some steps in the predetermined process terminate, or a predetermined time elapses, then the transparent window 110 is moved behind the application 120. Thus, while the transparent window 110 is displayed in front of the application 120, the input from the operator is not reflected on the application 120, so that the operator's misoperation can be prevented.

Figure 3:
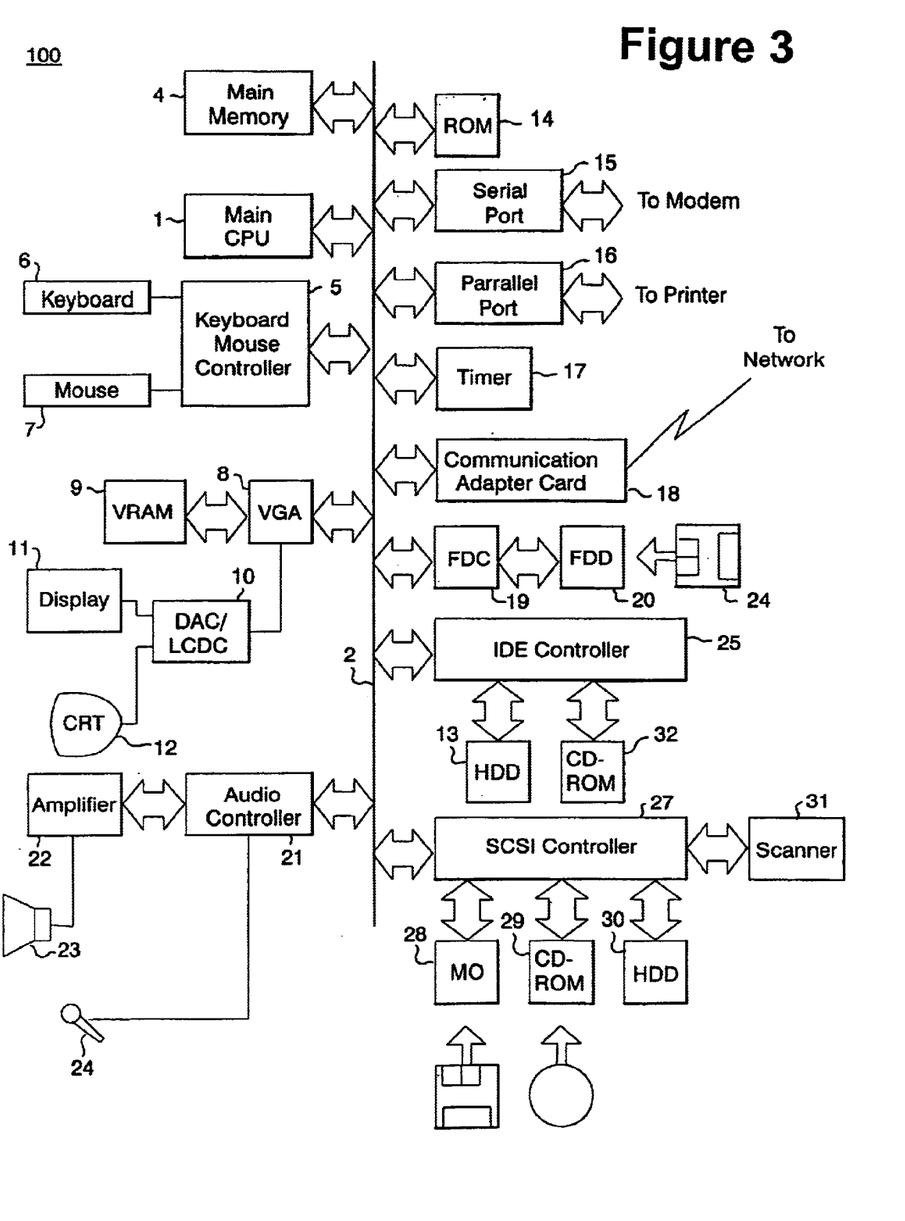
FIG. 3 is a block diagram showing the hardware configuration.

FIG. 3 is a schematic diagram of a hardware configuration for implementing the misoperation prevention apparatus 100 of the present invention. The misoperation prevention apparatus 100 includes a central processing unit (CPU) 1 and a memory 4. To the CPU 1 and the memory 4, hard disk drives 13 and 31 are connected via a bus 2 and the like. A floppy disk drive 20 (or a media drive 26, 28,29, or 30 such as for MO 28, CD-ROMs 26 and 29, or the like) is connected to the bus 2 via floppy disk controller 19 (or various controllers such as an IDE controller 25, and a SCSI controller 27).

Into the floppy disk drive 20 (or the media drive 26, 28, 29, or 30 such as for MO, CD-ROM), a floppy disk (or a medium such as MO or CD-ROM) is inserted, and on the storage medium such as the floppy disk, hard disk drive 13, or ROM 14, the code of a computer program can be recorded for giving instructions to the CPU and the like in cooperation with the operating system to implement the present invention, and it is executed when loaded into the memory 4. This computer program may be compressed, or divided into a plurality of pieces so as to be recorded on a plurality of media.

The misoperation prevention apparatus 100 may be a system having user interface hardware, and as the user interface hardware, for instance, there are a pointing device 7 (such as mouse, joystick, or trackball), a keyboard 6 for supporting the keying, and displays 11 and 12 for presenting image data to the user. Further, a speaker 23 receives the audio signal from an audio controller 21 via an amplifier 22, and outputs it as a voice.

The misoperation prevention apparatus 100 of the present invention can communicate with other computers or the like via a serial port 15 and a modem, or a communication adapter 18 such as token ring.

The present invention can be embodied by conventional personal computers (PC) or workstations, or computers built in various types of home electrical products such as television sets or facsimiles, or the combination of these. However, these structural elements are given by way of example, and not all the structural elements are the indispensable structural elements of the present invention. In particular, since the present invention is to invalidate an operator's input which interferes with the normal operation of an application, the structural elements such as the serial port 15, communication adapter card 18, audio controller 21, amplifier 22, and speaker 23 are not essential in an embodiment of the present invention.

Preferably, the operating system is the one that supports a GUI multi-window environment as standard, such as Windows (trademark of Microsoft) and X Windows System (trademark of the X Consortium) on AIX (trademark of IBM), but it is not limited to a specific operating system environment.

Now, the system configuration of the present invention is described with reference to the block diagram of FIG. 4. In the preferred embodiment of the present invention, the misoperation prevention apparatus 100 comprises an input unit 201, and operating system 203, and output unit 205, a web browser 207, a transparent window control unit 209, a transparent window procedure 215, a timer 217, a transparent window main body 219, and an attribute setting unit 221.

The operating system 203 generates a transparent window 110 to be described later, and outputs a window message to a predetermined application. Further, it transmits the operator's input obtained from the input unit 201 to the predetermined application, and outputs the information received from the application side to the output unit 205. The input unit 201 receives the input of a pointing device such as a mouse, joystick, or touch panel, or a keyboard.

The web browser 207 accesses a web server via a network, and obtains various information including JavaScript. In the preferred embodiment of the present invention, the web browser 207 is the application for which the operator performs an operation on the display screen, but the idea of the present invention is not limited to this, and an application other than the browser may be the target application of misoperation prevention.

The transparent window control unit 209 controls the generation and disappearance of the transparent window 110. Further, it asks the operating system 203 to change the position (in the direction of the Z-axis) of the transparent window 110.

The window procedure 215 responds to a timer interruption to ask the operating system to move the transparent window 110 to the rearmost position.

The timer 217 watches the lapse of the predetermined time set in the attribute setting unit 221, and if the predetermined time elapses, informs the transparent window control unit 209 of it.

The transparent window main body 219 appears in front of the application window of the target application to block the operator's input to the target application 207. In the preferred embodiment of the present invention, the transparent window main body 219 is implemented as exe of the C language. The transparent window main body 219 may be completely colorless and transparent to make the operator be unconscious of the transparent window, or it may be a colored window having transparency or a partially transparent window to clearly show the existence of the transparent window to the operator.

The attribute setting unit 221 enables the operator to set attribute information such as a time-out value, and holds the attribute information. In the preferred embodiment of the present invention, the attribute setting unit 221 is implemented as the registry of windows.

Figure 4:
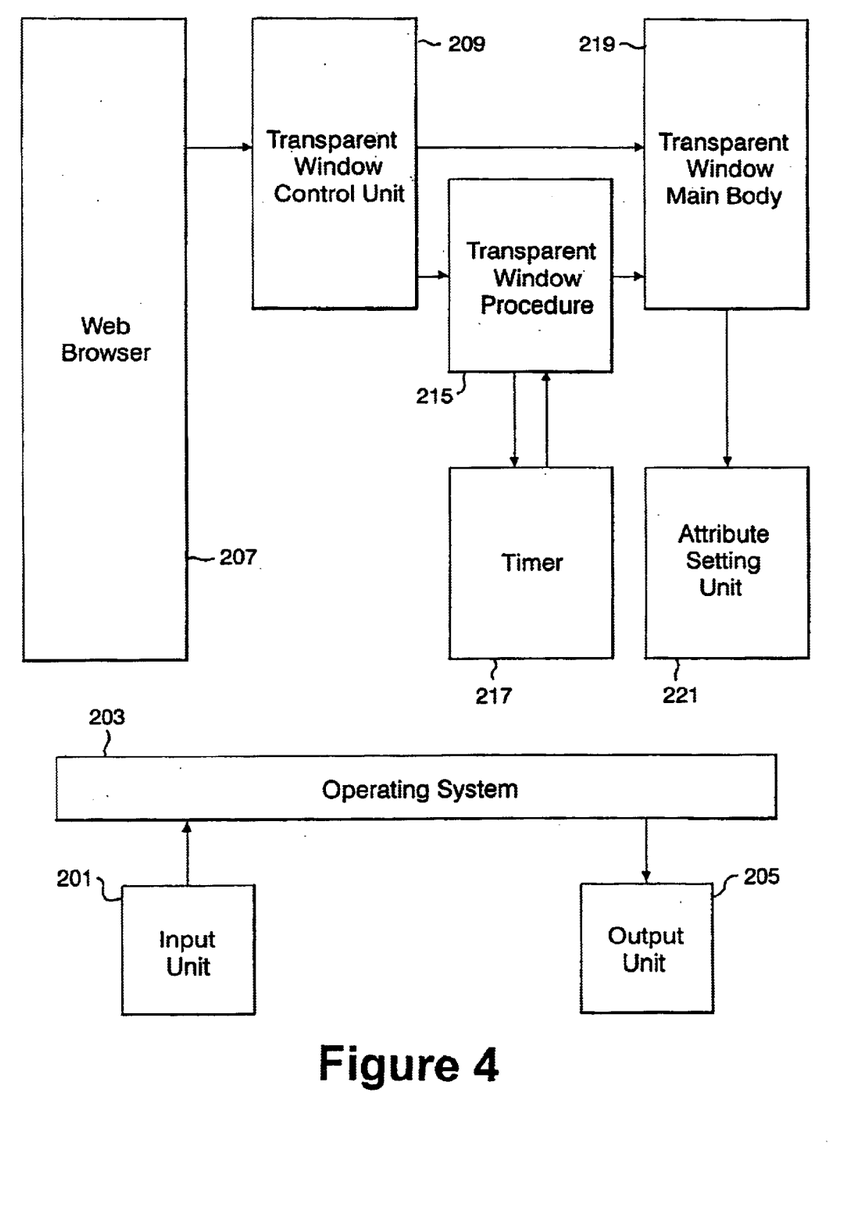
FIG. 4 is a block diagram showing the process elements.

The each functional block shown in FIG. 4 has been described above. These functional blocks are logical functional blocks, which do not mean that each of them is implemented by one discrete piece of hardware or software, but can be implemented by combined or common pieces of hardware or software.

Figure 5:
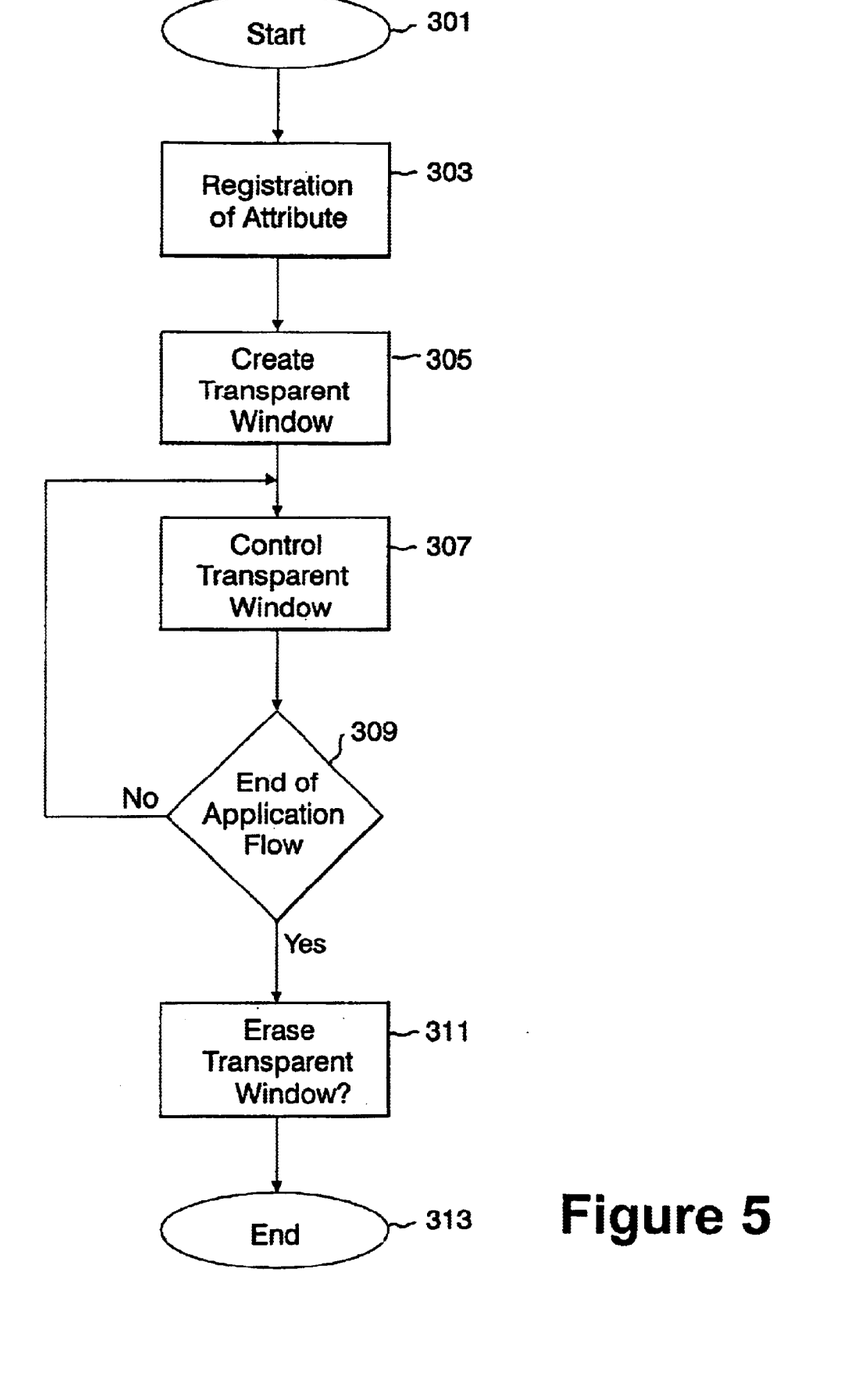
FIG. 5 is a chart showing the process procedure in the preferred embodiment of the present invention.

FIG. 5 is a flowchart showing the procedure of the process in the preferred embodiment of the present invention. As shown in the figure, the procedure starts with step 301. Prior to starting the procedure, the operator has registered the attribute information such as the time-out value of the timer 217 in the attribute setting unit 221 (step 303).

When the procedure is initiated, first, a transparent window starting HTML 400 is loaded into the web browser 207, and a transparent window 110 is generated (step 305). In the preferred embodiment of the present invention, the transparent window control unit 209, in which a code of JavaScript operates, invokes a program of the C language through a Java class, and asks the operating system 203 to initiate the process of the transparent window main body 219.

Figure 6:
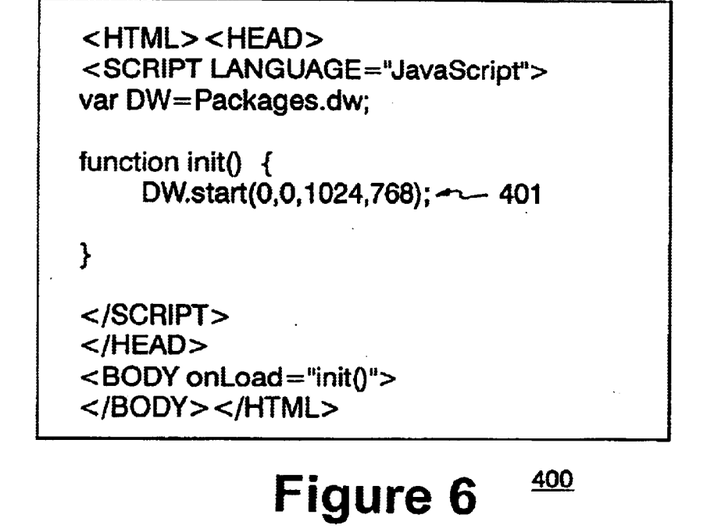
FIG. 6 is a figure showing the HTML for generating the transparent window in the preferred embodiment of the present invention.

When started, the transparent window main body 219 gets the time-out value for the timer 217 set in the attribute setting unit 221, registers the transparent window procedure 215 in the operating system 203, and creates the transparent window 110 at a specified position and with a specified size in the rearmost part. In the example of FIG. 6, when the transparent window starting HTML 400 is loaded, the transparent window 110 of a size (1024×768) is created n the rearmost part at a position (0,0) (code 401).

Figure 7:
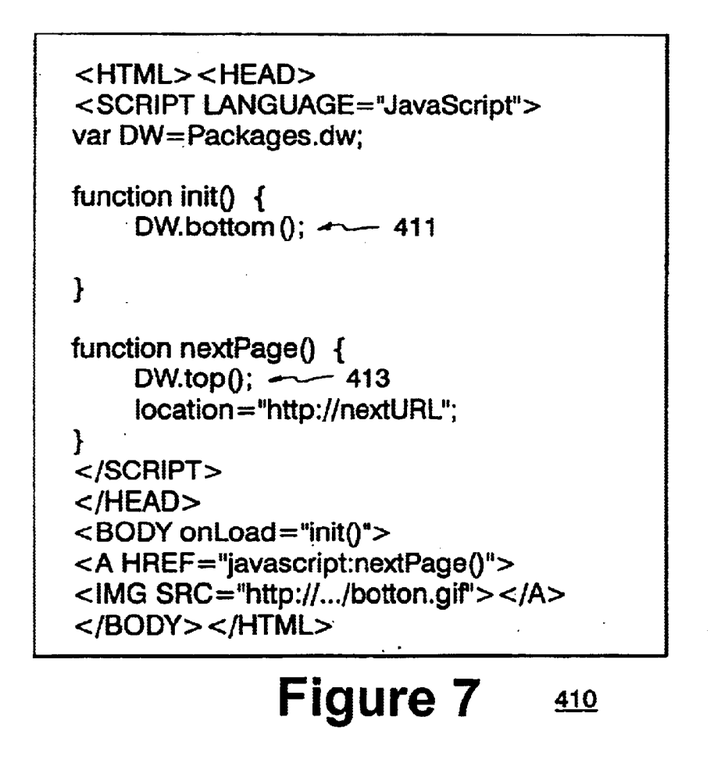
FIG. 7 is a figure showing the HTML for controlling the transparent window in the preferred embodiment of the present invention.

And, waiting for the operator's input, it responds to the execution of a predetermined operation to load a transparent window control HTML 410 shown in FIG. 7 into the web browser 207 (step 307). In the preferred embodiment of the present invention, the transparent window control HTML 410 is built in the head of a program related to the button for enabling the mouse input blocking control.

When the transparent window control HTML 410 is loaded into the web browser 207, the transparent window control unit 209 operates the code of JavaScript, invokes the program of the C language through a Java class, and asks the operating system 203 to send a window message for mouse input blocking control to the transparent window procedure 215.

The transparent window procedure 215 sends a window message to the operating system 203 to change the window arrangement for positioning the transparent window 110 in the foremost part, starts up the timer 217 (does not perform this if the time-out value is 0), and if the time-out occurs (a message is transmitted from the timer 217 to the window procedure 215 via the operating system 203), it asks the window operating system 203 to move the transparent window 110 to the rearmost part. Since the transparent window 110 discards all the received mouse events, the mouse input can be blocked when the transparent window 110 is displayed on the foremost part. Further, if a mouse event occurs in the transparent window 110, a display may be outputted to the effect that any input is not accepted now, or an operation procedure for canceling the protection by the transparent window may be displayed.

The request to cancel the mouse input blocking is issued if various conditions are fulfilled. In the example of FIG. 7, the transparent window is moved to the foremost part when the button of the next page is pushed (code 413), and the transparent window 110 is moved to the rearmost part when this HTML is loaded (code 411). Upon the request to cancel the mouse input blocking, the transparent window procedure 215 sends a message to the operating system 203 to change the window arrangement for positioning the transparent window 110, in the rearmost part. Since the transparent window 110, which discards all the accepted mouse events, moves tho the rearmost part, the mouse input blocking is cancelled.

Figure 8:
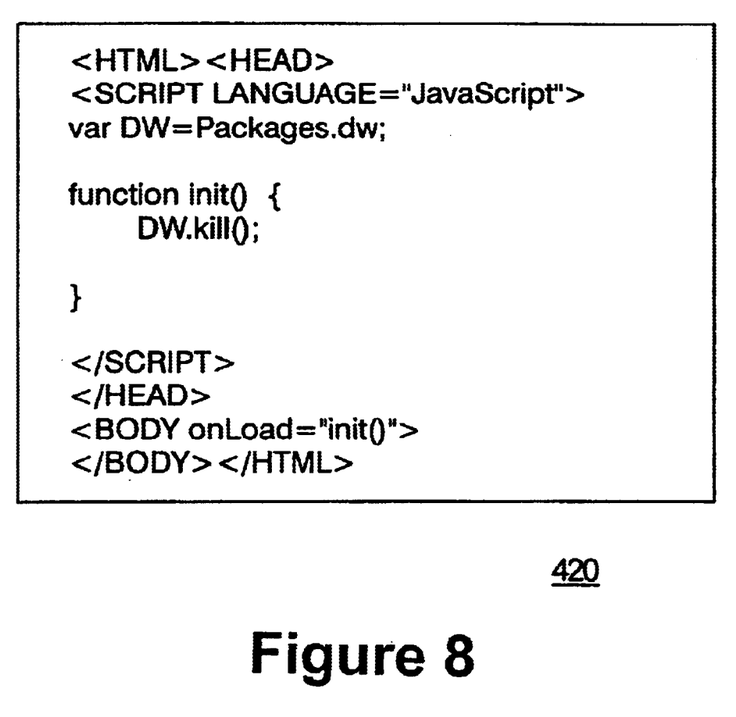
FIG. 8 is a figure showing the HTML for erasing the transparent window in the preferred embodiment of the present invention.

In the preferred embodiment of the present invention, as shown in FIG. 5, if the target application (web browser 207) is closed (step 309), the transparent window 110 is also erased (step 311). Specifically, to erase the transparent window 110, the transparent window erasing HTLM 420 is loaded into the web browser 207. The transparent window control unit 209 operates the code of JavaScript, invokes a program of the C language through a. Java class, and asks the operating system 203 to terminate the process of the transparent window main body 219. The process of the web browser 207 terminates after the end of this task.

As described above, in accordance with the present invention, a system can be provided in which, even if the time interval between the normal operation and the misoperation by the operator is very short, the misoperaton is invalidated without making a radical change of the process of an application.

While the invention has been particularly shown and described with respect to preferred embodiments thereof, it will be understood by those skilled in the art that the foregoing and other changes in form and details may be made therein without departing form the spirit and scope of the invention.

What is claimed is:

1. An error prevention method which is executed on an apparatus having a display screen for displaying an application window representing an executing process, and a pointing device for pointing to a position on said display screen, said method comprising the steps of:
   (a) generating a transparent window and positioning it behind said application window; and
   (b) moving said transparent window in front of an application window in response to the detection of a predetermined operation input using said pointing device, and wherein the overlapping portions of the transparent window prevent the user from applying input to the executing process, via the application window, that interferes with normal operations of the executing process while still allowing the user to see the application window.

2. A method according to claim 1, comprising the further step of moving the transparent window from in front of the application window to behind the application window after a defined time period.

3. A method according to claim 2, wherein said defined time period is set by the user.

4. An error prevention method which is executed on an apparatus having a display screen for displaying an application window, and a pointing device for pointing to a position on said display screen, said method comprising the steps of:
   (a) generating a transparent window and positioning it behind said application window;
   (b) responding to the detection of a predetermined operation input using said pointing device for executing a process corresponding to said predetermined operation;
   (c) moving said transparent window in front of said application window, and wherein the overlapping portions of the transparent window prevent the user from applying input to the executing process, via the application window, that interferes with normal operations of the executing process while still allowing the user to see the application window; and
   (d) moving said transparent window behind said application window after the execution of said process terminates.

5. A method according to claim 4, wherein the step of moving said transparent window in front of said application window includes the step of:
   responding to a given error input from the user by (i) moving said transparent window in front of said application window, and (ii) invalidating said error input, wherein said error input does not affect operations of the executing process.

6. An error prevention method which is executed on an apparatus having a display screen for displaying an application window, a pointing device for pointing to a position on said display screen, and a timer, said method comprising the step of:
   (a) generating a transparent window and positioning it behind said application window;
   (b) executing a process corresponding to a predetermined operation input using said pointing device in response to the detection of said predetermined operation;
   (c) moving said transparent window in front of said application window, and wherein the overlapping portions of the transparent window prevent the user from applying input to the executing process, via the application window, that interferes with normal operations of the executing process while still allowing the user to see the application window; and
   (d) moving said transparent window behind said application window in response to a timer interruption that occurs after a predetermined time elapses since said transparent window has been moved in front of said application window in said step (c), thereby allowing the user to apply input, via the application window, to said process.

7. A method according to claim 6, wherein the step of moving said transparent window in front of said application window includes the step of:
   responding to a given error input from the user by (i) moving said transparent window in front of said application window, and (ii) invalidating said error input, wherein said error input does not affect operations of the executing process.

8. An error prevention apparatus having a display screen for displaying an application window representing an executing process, and a pointing device for pointing to a position on said display screen, said apparatus comprising:
   (a) a transparent window control unit for generating a transparent window, and instructing the operating system to position it behind said application window;
   (b) a transparent window main-body generated by said operating system; and
   (c) a transparent window procedure for instructing the operating system to move said transparent window in front of said application window in response to the detection of a predetermined operation input using said pointing device, and wherein the overlapping portions of the transparent window to prevent the user from applying input to the executing process, via the application window, that interferes with normal operations of the executing process while still allowing the user to see the application window.

9. A storage medium for storing a software product for error prevention which is executed on an apparatus having a display screen for displaying an application window representing an executing process, and a pointing device for pointing to a position on said display screen, said software product comprising:

(a) a program code for instructing said apparatus to generate a transparent window and position it behind said application window; and (b) a program code for instructing said apparatus to move said transparent window in front of said application window in response to the detection of a predetermined operation input using said pointing device, and wherein the overlapping portions of the transparent window to prevent the user from applying input to the executing process, via the application window, that interferes with normal operations of the executing process while still allowing the user to see the application window.

10. A storage medium for storing a software product for error prevention which is executed on an apparatus having a display screen for displaying an application window, and a pointing device for pointing to a position on said display screen, said software product comprising:

(a) a program for instructing said apparatus to generate a transparent window and positioning it behind said application window;

(b) a program code responsive to the detection of a predetermined operation input using said pointing device for instructing said apparatus to execute a process corresponding to said predetermined operation;

(c) a program code for instructing said apparatus to move said transparent window in front of said application window, and wherein the overlapping portions of the transparent window to prevent the user from applying input to the executing process, via the application window, that interferes with normal operations of the executing process while still allowing the user to see the application window; and (d) a program code for instructing said apparatus to move said transparent window behind said application window after the execution of said process terminates.

11. A storage medium for storing a software product for error prevention which is executed on an apparatus having a display screen for displaying an application window, a pointing device for pointing to a position on said display screen, and a timer, said software product comprising:

(a) a program code for instructing said apparatus to generate a transparent window and position it behind said application window;

(b) a program code responsive to the detection of a predetermined operation input using said pointing device for instructing said apparatus to execute a process corresponding to said predetermined operation;

(c) a program code for instructing said apparatus to move said transparent window in front of said application window, and wherein the overlapping portions of the transparent window to prevent the user from applying input to the executing process via the application window, that interferes with normal operations of the executing process while still allowing the user to see the application window; and (d) a program code for instructing said apparatus to move said transparent window behind said application window in response to a timer interruption that occurs after a predetermined time elapses since said transparent window has been moved in front of said application window in said step (c).

* * * * *